United States Patent [19]

Ishida

[11] 4,360,192

[45] Nov. 23, 1982

[54] GAS SPRING, FILLING AND SEALING STRUCTURE

[75] Inventor: Kunio Ishida, Yokohama, Japan

[73] Assignee: Tokico Ltd., Kawasaki, Japan

[21] Appl. No.: 203,365

[22] Filed: Nov. 3, 1980

[30] Foreign Application Priority Data

Nov. 9, 1979 [JP] Japan .......................... 54-155611[U]

[51] Int. Cl.³ ............................................... F16F 9/43
[52] U.S. Cl. ................... 267/64.28; 277/19; 277/59; 188/322.17
[58] Field of Search ................ 188/322.17, 322.21; 267/64.28, 118, 120, 124; 277/17, 18, 19, 59

[56] References Cited

U.S. PATENT DOCUMENTS

| | | | |
|---|---|---|---|
| 1,375,376 | 4/1921 | Fynn | 277/17 X |
| 3,076,643 | 2/1963 | Bittel | 267/64.28 |
| 3,369,674 | 2/1968 | Carle | 267/120 X |
| 3,856,287 | 12/1974 | Freitag | 188/322.17 X |
| 4,030,716 | 6/1977 | Freitag | 267/64.28 |
| 4,044,866 | 8/1977 | Ishida | 188/322.21 |
| 4,071,057 | 1/1978 | Nagase | 188/322.17 X |
| 4,219,190 | 8/1980 | Nagase | 267/64.28 |

FOREIGN PATENT DOCUMENTS

| | | |
|---|---|---|
| 1971284 | 10/1967 | Fed. Rep. of Germany . |
| 2614927 | 10/1977 | Fed. Rep. of Germany ...... 267/120 |
| 52-112814 | 9/1977 | Japan . |

Primary Examiner—George E. A. Halvosa
Attorney, Agent, or Firm—Wenderoth, Lind & Ponack

[57] ABSTRACT

A gas spring includes a vertical cylinder, a piston rod extending out of the cylinder through the upper end thereof, a rod guide provided on the upper end of the cylinder for guiding the piston rod, a first seal mounted on the rod guide, a partition wall provided in the cylinder to partition the interior thereof into an upper oil chamber and a lower gas chamber, and a second seal cooperating with the partition wall and slidingly engaging with the piston rod. At least two normally closed first passages are provided in the rod guide and communicate the interior of the cylinder with the outside when filling gas and in filling oil into the cylinder, and a second passage is provided to communicate the gas chamber with the oil chamber when filling gas into the gas chamber.

5 Claims, 4 Drawing Figures

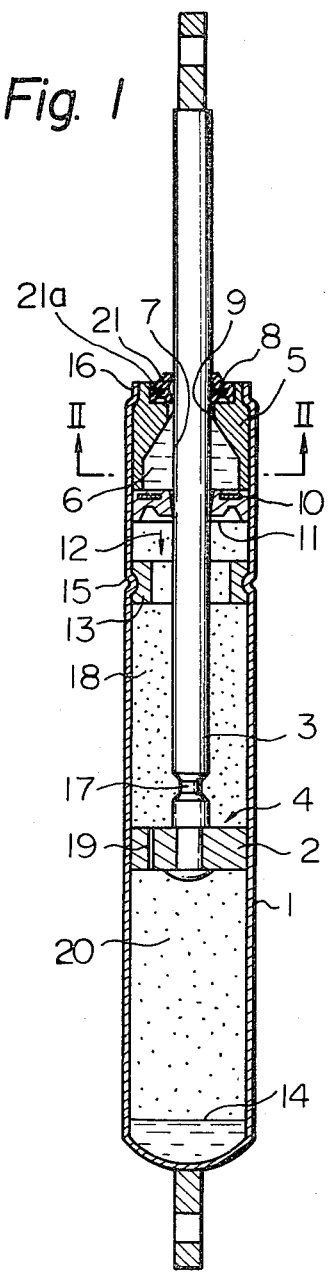
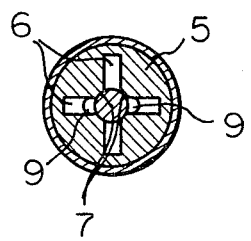
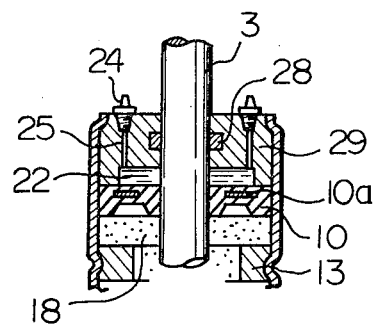
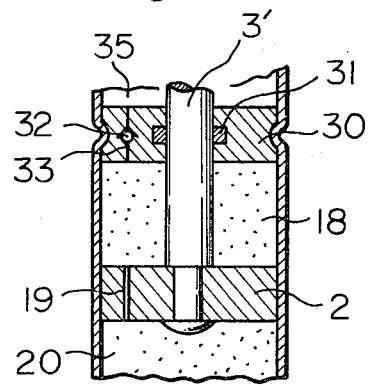

GAS SPRING, FILLING AND SEALING STRUCTURE

BACKGROUND OF THE INVENTION

This invention relates to a gas spring and, particularly to a gas spring of the kind including a generally vertical cylinder having a closed lower end, a piston working in the cylinder, a piston rod secured to the piston rod and extending out of the cylinder through the upper end thereof, and pressurized gas enclosed in the cylinder. A rod guide is usually mounted on the upper end of the cylinder for guiding the sliding movement of the piston rod and mounting a seal which slidingly engages with the piston rod and seals the interior of the cylinder from the outside.

Since the sliding movement between the piston rod and the seal is performed in a dry condition, the frictional resistance is large and the seal is apt to be damaged.

For eliminating the shortcomings aforementioned, there has been proposed an arrangement to provide an oil chamber in the upper portion of the cylinder as shown, e.g. U.S. Pat. No. 4,030,716. A portion of the piston rod contacts with the oil in the oil chamber, thus the piston rod contacts with the seal in a wet condition, thereby improving the sliding characteristics. However, it is necessary to fill into the cylinder the high pressure gas and the oil separately and the filling operations are difficult and time consuming.

SUMMARY OF THE INVENTION

An object of the invention is to provide an arrangement to easily fill the high pressure gas and the oil into the gas spring of the kind aforementioned. The gas spring according to the invention further comprises at least two normally closed first passages provided in the rod guide for communicating the interior of the cylinder with the outside and which are open when filling gas and oil into the cylinder, a stop provided in the cylinder for restricting the extending movement of the piston rod, a partition wall provided in the cylinder and below the first seal, a second seal for sealingly and slidingly engaging with the piston rod and cooperating with the partition wall to define a gas chamber below the second seal and an oil chamber between the first mentioned seal and the second seal, and a second passage connecting the gas chamber with the oil chamber when filling gas into the gas chamber.

The invention will now be described in detail with reference to the accompanying drawings exemplifying various embodiments of the invention.

BRIEF DESCRIPTION OF THE DRAWINGS

In the drawings:

FIG. 1 is a longitudinal sectional view of a gas spring according to the invention;

FIG. 2 is a sectional view taken along line II—II in FIG. 1;

FIG. 3 is a partial sectional view showing a modified form; and

FIG. 4 is a partial sectional view of another modified form.

DETAILED DESCRIPTION OF THE PREFERRED EMBODIMENTS

The gas spring illustrated in FIGS. 1 and 2 comprises a cylinder 1 having a closed lower end, a piston 2 working in the cylinder, a piston rod 3 secured to the piston 2 and extending out of the cylinder 1 through the upper end of the cylinder 1. The piston 2 and the piston rod 3 constitute a piston-piston rod assembly 4. The piston rod 3 slidingly passes through a rod guide 5 which is secured to the upper end of the cylinder 1.

The rod guide 5 has, in the inner circumference thereof, a plurality of radial grooves 6 to extend from the lower end of the rod guide 5 to the axially mid portion thereof. A recess 8 is formed in the upper central portion of the rod guide 5. The recess 8 is communicated with the upper ends of two grooves 6 through two or more passages 9. Preferably, two passages 9 extend respectively from diametrically opposing two grooves 6 as shown in FIG. 2. The passages 9 constitute the first passages according to the invention. A seal 21 is received in the recess 8 to normally close the passages 9 and to slidingly engage with the piston rod 3, thereby sealing the gas spring.

A second seal 10 is provided in the cylinder 1 and is displaceable between the rod guide 5 and an annular stop 13 secured to the cylinder 1. The second seal 10 partitions the interior of the cylinder 1 into a gas chamber, consisting of chambers 18 and 20 which are permanently connected through a restricted passage 19 formed in the piston 2, and an oil chamber formed by the grooves 6. Thus, the second seal 10 acts as a partition wall according to the invention. The gas chamber 18, 20 contains therein high pressure gas, and may contain a small amount of oil 14. The oil chamber receives therein oil. Preferably, the second seal 10 has a downwardly directed lip 11 as shown in FIG. 1 which deflects in the radially outward direction in receiving downward pressure and deflect in the radially inward direction or toward the circumference of the piston rod 3 in receiving the pressure in the gas chamber, whereby the pressure in the oil chamber can be reduced as compared with the pressure in the gas chamber.

Further, there is provided in the piston rod 3 a reduced diameter portion 17 as shown in FIG. 1. The location of the reduced diameter portion 17 is such that when the piston rod 3 takes the maximum extended position with the piston 2 abutting with the stop 13 and the second seal 10 is displaced towards stop 13 to abut with the stop 13, the lip 11 of the second seal 10 aligns with the reduced diameter portion 17 to form therebetween an annular passage communicating the opposite sides of the second seal 10. The annular passage constitutes the second passage according to the invention.

In assembling the gas spring, the piston and piston rod assembly 4 is inserted into the cylinder 1 together with a small amount of oil 14. The oil 14 is effective to lubricate the cylinder 1 and, when the piston 2 approaches to the innermost position in operating the gas spring, the oil 14 cooperates with the restricted passage 19 in the piston 2 to damp the piston 2. Next, the stop 13 is inserted into the cylinder and is secured by such as swaging the cylinder 1 from the outside as shown by the reference numeral 15. The second seal 10 and the rod guide 5, with the seal 21 not being received in the recess 8, are inserted into the cylinder 1, and the rod guide 5 is secured to the cylinder 1 by swaging the upper end of the cylinder as shown by the numeral 16. The piston 2 and the second seal 10 are located to abut respectively the lower and upper sides of the stop 13 so that the annular second passage is formed between the lip 11 of the second seal 10 and the reduced diameter portion 17 of the piston rod 3. At least the upper end portion of the cylinder 1 is received in a pressurized gas supplying device (not shown), whereby the pressurized gas is supplied through the first passages 9 into the cylinder 1 and through the second passage and the restricted passage 19 into the chamber 20. When a predetermined amount of gas is supplied into the cylinder 1, the piston rod 3 is displaced downwards so that the reduced diameter portion 17 separates from the lip 11 of the second seal 10 thereby closing the second passage. The cylinder 1 is taken out of the gas supplying device, then, the pressure of the gas received in the upper side of the seal 10 is released to the atmospheric pressure, and the seal 10 displaces upwards to abut with the lower surface of the rod guide 5. Thereafter, oil is supplied into a space defined above the seal 10 or into grooves 6 through one of the passages 9, then air trapped in the grooves 6 can be exhausted through the other passage 9. The oil filling operation is performed until the oil projects through the other passage 9, which indicates that the space is completely filled with oil. Thus, the oil filling operation is very easy and reliable and can be performed very quickly. Thereafter the seal 21 is tightly fitted in the recess 8 so as to close the cylinder and to slidingly engage with the piston rod 3.

FIG. 3 shows a modified form wherein a rod guide 29 has an O-ring seal 28 permanently and slidingly engaging with the piston rod 3 and two openings 24 bypassing the seal 28. Normally, the openings 24 are closed by plugs 25. In filling gas into the gas spring, at least one plug 25 is removed and in filling oil into the cylinder, one of the openings 24 acts as an oil filling passage and the other opening 24 acts as a gas exhausting passage.

FIG. 4 shows a modified form relating to the second seal 10. In FIG. 4, an O-ring seal 31 is mounted in the inner circumference of an annular stop 30. In this embodiment, the stop 30 acts as the partition wall according to the invention, and gas chamber 18, 20 is defined below the stop 30 and an oil chamber 35 is defined above the stop 30. Further, there is provided in the stop 30 a second passage 33 having therein a check valve 32 of any suitable type. The valve 32 opens in supplying the gas into the gas chamber and, therefore, the reduced diameter portion 17 in the first embodiment can be omitted. The embodiment of FIG. 4 is advantageous in that the volume of the oil chamber 35 can be increased as desired.

Shown at 10a and 21a in FIGS. 3 and 1 are metal rings reinforcing the seals 10 and 21, respectively.

As described heretofore, the gas spring according to the invention comprises a vertical cylinder having a closed lower end, a piston working in the cylinder, a piston rod secured to the piston and extending out of the cylinder through the upper end thereof, a rod guide disposed on the upper end of the cylinder for slidingly guiding the piston rod, a stop provided in the cylinder for restricting the upward movement of the piston, at least two first passages provided in the rod guide to communicate the interior of the cylinder with the outside in filling gas and oil into the gas spring and being normally closed, a first seal mounted on the rod guide for slidingly engaging with the piston rod to seal the interior of the gas spring from the outside, a partition wall provided in the cylinder and below the first seal, a second seal sealingly and slidingly engaging with the piston rod and cooperating with the partition wall to define a gas chamber and an oil chamber, and a second passage connecting the gas chamber with the oil chamber in filling gas into the gas chamber. Thus it is possible to perform the gas filling operation and the oil filling operation easily, reliably and quickly. The enclosed gas is sealed by the oil chamber, thus, the sealing characteristics can be improved. Further, the seals engage with the piston rod in the wet condition thereby reducing the frictional resistance and elongating the service life of the seals.

What is claimed is:

1. A gas spring comprising:
   a vertical cylinder having a closed lower end;
   a piston slidably positioned in said cylinder;
   a piston rod secured to said piston and extending out or said cylinder through the upper end thereof;
   a rod guide secured to said upper end of said cylinder for slidingly guiding said piston rod;
   a stop provided in said cylinder for restricting the upward movement of said piston;
   a first seal mounted on said rod guide and slidingly engaging with said piston rod to sealingly close the interior of said cylinder from the exterior;
   at least two normally closed first passages provided in said rod guide for filling gas and, thereafter, oil into the gas spring;
   a second seal provided between said rod guide and said stop and sealingly and slidingly engaging with said piston rod, said second seal being sealingly displaceable in said cylinder between an uppermost position abutting said rod guide and a lowermost position abutting said stop; and
   a second passage formed between the inner circumference of said second seal and a portion of the outer circumference of said piston rod only when said piston rod is in the uppermost position thereof and said second seal is in said lowermost position thereof;
   whereby, when filling oil into a space between said first and second seals, one of said first passages is utilized to introduce oil into said space while the other first passage is utilized to exhaust gas from said space.

2. A gas spring as claimed in claim 1, wherein said portion of said outer circumference of said piston rod is of reduced diameter.

3. A gas spring as claimed in claim 1, wherein said first passages are normally closed by said first seal.

4. A gas spring as claimed in claim 1, wherein said rod guide has therein a plurality of radial grooves opening into the lower end of said rod guide and defining said space, and said two first passages extend upwardly from two of said radial grooves through said rod guide.

5. A gas spring as claimed in claim 4, wherein said rod guide has formed in the upper portion thereof a recess receiving said first seal, and said two first passages extend from said two radial grooves to said recess.

* * * * *